R. L. STOKES.
TANK FLOAT VALVE MECHANISM.
APPLICATION FILED APR. 9, 1914.
1,202,238.
Patented Oct. 24, 1916.
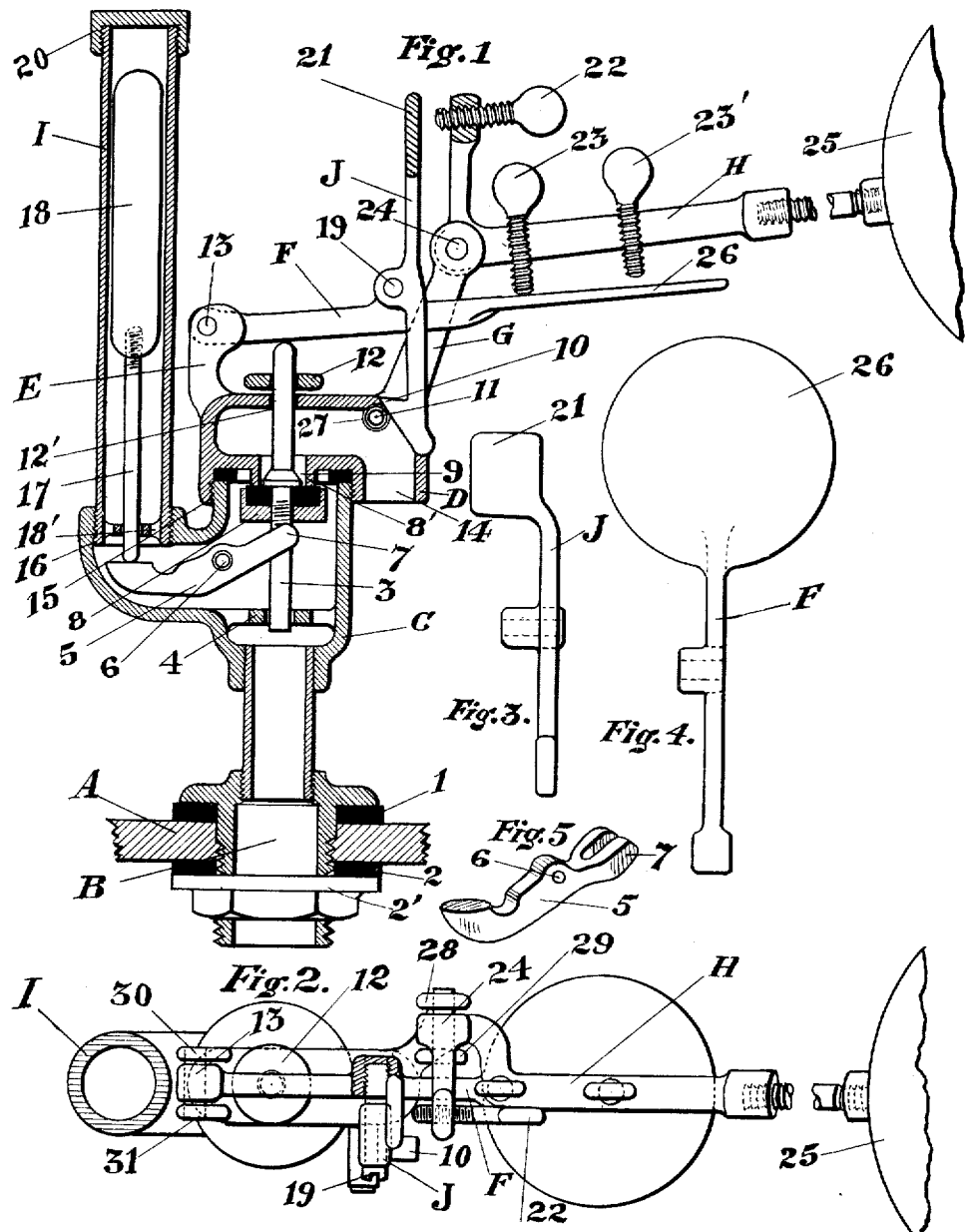

UNITED STATES PATENT OFFICE.

ROBERT L. STOKES, OF CINCINNATI, OHIO, ASSIGNOR, BY DIRECT AND MESNE ASSIGNMENTS, OF ONE-HALF TO WILL H. DARROW AND ONE-HALF TO THOMAS J. BYRNE, BOTH OF CINCINNATI, OHIO.

TANK FLOAT-VALVE MECHANISM.

1,202,238.  Specification of Letters Patent.  Patented Oct. 24, 1916.

Application filed April 9, 1914. Serial No. 830,586.

*To all whom it may concern:*

Be it known that I, ROBERT L. STOKES, a citizen of the United States, residing at Cincinnati, in the county of Hamilton and State of Ohio, have invented new and useful Improvements in Tank Float-Valve Mechanism, of which the following is a specification.

My invention relates to the flushing tanks of toilet rooms, and more particularly to improvements in float valves themselves and the means of opening and closing them. One remarkable difference between this invention and the one previously filed by me having Serial No. 814,332 is found in the fact that, in this invention, there is but one float valve, while in that of Serial No. 814,332 there may be a plurality of float valves.

The object of my invention is to afford a single float valve mechanism in which the single float valve can be opened and closed as noiselessly as that of a plurality of float valves. I accomplish this object by means of the mechanism hereinafter described and also illustrated by the accompanying drawings, in which like reference characters represent like parts in all figures.

Figure 1 is a vertical section of my invention showing certain parts thereof in elevation. Fig. 2 is a plan view of my invention showing certain parts in horizontal section. Fig. 3 is a detached view of the locking hook of my invention viewed in elevation from the direction of the float ball. Fig. 4 is a detached view of the lever bearing said locking hook of my invention, viewed from the top of the flushing tank. Fig. 5 is a detached perspective view of the float valve closing lever of my invention.

In Fig. 1, A is the flushing tank. B is the inlet pipe. C is the float valve water cup. D is a hollow cap adapted to screw onto the mouth of said water cup. E and G are standards extending upward from, and formed integrally with said cap. F is a lever having one of its ends attached to the saddle-bearing 30 and 31 by means of the screw 13. H is the stem of the float ball 25. 24 is a screw by means of which the stem H is attached to the standard G. I is a water standpipe and 20 is a cap adapted to screw onto the upper end thereof. J is a hook attached to the lever F by means of the screw 19, on which screw said hook is adapted to swing freely. 1 is a washer intervening between the tank A and the water cup C on the inside of the tank, and 2 is a similar washer intervening between said tank and the nut 2', said washers being adapted to prevent the escape of water from said tank around the inlet pipe B. The nut 2' is adapted to bind all of the aforesaid members firmly together. 3 is the float valve stem on which is mounted the float valve 8 which has in its upper surface a circular recess into which is tight-fitted a washer, preferably of leather, which washer is adapted to engage the circular boss 8' and cut off the flow of water through the opening 9 into the downward extension 14 of the inlet pipe B. 12 is a collar, loosely-fitted onto the upper end of said float valve stem and is adapted to prevent the water escaping through the opening 12' from spurting out of the top of said tank. 4 is a horizontally positioned support extending across the bottom of said water cup, to the inner sides of which its ends are attached, said support, through an opening in which said stem passes, being adapted to steady and give direction to said float valve stem in its movement up and down. 5 is a lever fulcrumed on the screw 6 which is screwed into tapped bores through the sides of said water cup. 7 is the bifurcated end of said lever, which end is adapted to receive said float valve stem. 10 is the barbed end of said hook J, which hook when depressed, is adapted to engage the pin 11, which pin has mounted thereon the revolving sleeve 27, which sleeve is adapted to prevent said barbed end from wearing said pin in two. 15 are the threads, by means of which said cap is screwed onto said water cup, and 16 are the threads, by means of which the lower end of said water stand pipe is screwed onto said water cup, said pipe communicating directly with the inside cavity of said cup. 17 is the supporting stem of the weight 18. 18' is a horizontally positioned support extending across the mouth of said pipe to the inner surface of which its ends are attached, said support, through an opening in which said stem passes, being adapted to steady and give direction to said stem in its upward and downward movement. Said weight 18 tends to close said float valve whether the water pressure is on or off. 21 is a rectangular enlargement of the upper end of the hook J and is adapted to receive the impact of the end of the screw 22. 23 and 23' are screws passing through the stem H, the lower end of screw 23 is adapted to engage the circular enlargement 26 of the lever F, first in the descent of the float ball 25 and first, also, in the upward movement of said lever on account of the actuating force of lever 5 and weight 18 on said stem 3. 28 and 29 are the two sides of the saddle-bearing supporting said float ball stem.

Having thus described my invention in detail and by illustrations, I will now describe it as a working mechanism. The position of the several members of my invention as illustrated in Fig. 1 indicates that the float valve is closed and the tank is full of water. On the opening of the flush valve of the tank, the float ball 25 begins to fall and continuing in its downward movement, the lower end of screw 23 engages the enlarged end 26 of lever F, first and then the lower end of screw 23' engages said lever which lever in its downward movement engages the upper end of the float valve stem 3 and opens the float valve 8 which permits the water to flow through the opening 9 and into the downward extension 14 of the inlet pipe B, out of which extension said water passes into the tank A. When lever F reaches the lowest point of its depression, the barbed end 10 thereof engages the pin 11 thereby locking said lever down. The flushing valve is now closed. The water now continues to flow into the tank as aforesaid and said float ball begins to rise. When said float ball in its ascent reaches the point where the threaded end of screw 22 engages and sufficiently presses upon the enlarged end 21 of the hook J, the barbed end 10 of said hook is disengaged from the pin 11, and said lever rises. Simultaneously with the disengaging of said barbed end of said hook and the rising of said lever, weight 18 falls and presses the end 7 of the lever 5 up against the float valve 8 and closes it. At the time of the closing of said float valve, the rapid moving water in the water cup C is suddenly turned aside and flowing into the stand pipe I, suddenly strikes the elastic air confined within said stand pipe, and is thereby prevented from suddenly striking the inside surface of said water cup and from producing the noise that would inevitably result therefrom. Thus we come back to the point of beginning.

Having thus described my invention in detail, by illustrations and as a working mechanism, what I claim is:—

1. In a float valve mechanism, a water cup having a water inlet, a hollow cap therefor having alined ports in its upper and lower walls, the port in the lower wall serving as an outlet for said water cup, a depending boss surrounding said port, a rod vertically positioned within said cap, the upper portion of which rod extends through the ports in the walls of the cap, said rod carrying a recessed valve thereon inside the cap, which valve has a tight fitted washer in the recess thereof, and which valve is adapted to seat upon the depending boss and control the flow of water through the port which said boss surrounds, and a slidable collar upon said upper end outside the cup adapted to prevent the spurting of any water which might leak through the port in the cap and around the rod, a pipe communicating with the inside of the cap and closed at its upper end, said pipe forming an air chamber, a weight positioned in said air chamber, a lever fulcrumed midway its ends positioned wholly within the cup, one end of which lever engages a recessed valve and the other end of which acts as a support for the said weight which thus tends to close the valve.

2. In a tank float valve mechanism and in combination; a water cup; a hollow cap therefor; a short standard extending integrally upward from one portion of said cap and a longer standard extending integrally upward from another portion of said cap, said standards having preferably bifurcated free ends; a lever positioned horizontally above said cap, said lever having a circular enlargement on one end and a perforation through the other, said perforated end engaging the bifurcated end of said short standard, said lever having also a perforation through the central portion thereof; a pin extending horizontally from said cap and at approximately right angles to the vertical plane of said lever, said pin having thereon a revolving sleeve; a lever having a rectangular enlargement on one end, a hook on the other and a centrally positioned perforation therethrough, said lever being vertically positioned, said perforation being adapted to engage said centrally positioned perforation through said horizontally positioned lever by means of a screw passing through said perforations, said vertically positioned lever being adapted to oscillate on said screw, and said hook when depressed being adapted to engage said pin; a float; a stem therefor having the end portion opposite said ball bent at approximately right angles to said stem, the end of said end portion having a circular enlargement, said stem having a perforation therethrough near said bent end thereof, said bent end portion of said stem being positioned within the bifurcated upper end of said longer standard to which it is secured by means of a screw passing through said stem perforations and a perforation through the bifurcated upper end of said standard, said stem having also three set-screws passing therethrough, two through said stem between said perforation therethrough and said ball and the other through the enlarged end thereof, the threaded end of said first mentioned screws being adapted to engage the enlarged end of said horizontally positioned lever and the threaded end of said second mentioned screw being adapted to engage the enlarged end of said vertically positioned lever, and disengage the barbed end thereof from said pin.

3. In a tank float valve mechanism, the combination of a water cup having an inlet water chamber and a discharge water chamber divided by a ported diaphragm, a valve adapted to close the port in the diaphragm, a stem upon the valve, a weight adapted to carry the valve toward the diaphragm, a lever fulcrumed upon the water cup and engaging the stem of the valve, a float stem fulcrumed adjacent to the lever, means adapted to engage the lever to carry it to an operative position holding the valve from the diaphragm, a catch for the lever adapted to lock automatically when the lever assumes its operative position, and a projection upon the float stem adapted to unlock the catch upon the upward movement of the float stem.

4. In a tank float valve mechanism, the combination of a water cup having an inlet water chamber and a discharge water chamber divided by a ported diaphragm, a valve adapted to close the port in the diaphragm, a stem upon the valve, a weight adapted to carry the valve toward the diaphragm, a lever fulcrumed upon the water cup and engaging the stem of the valve, a float stem fulcrumed adjacent to the lever and having means adapted to engage the lever in the lowered position of the float to carry it to an operative position, holding the valve from the diaphragm, a catch for the lever adapted to lock automatically when the lever assumes its operative position, and a projection upon the float stem adapted to unlock the catch upon the upward movement of the float stem.

In testimony whereof I have hereunto set my hand in presence of two subscribing witnesses.

ROBERT L. STOKES.

Witnesses:
JOHN BAEHR,
C. M. BECHTEL.

Copies of this patent may be obtained for five cents each, by addressing the "Commissioner of Patents, Washington, D. C."